United States Patent
van de Wetering et al.

(10) Patent No.: US 12,330,400 B2
(45) Date of Patent: Jun. 17, 2025

(54) POLYPROPYLENE FILM WITH INCREASED HYDROPHOBICITY

(71) Applicant: SABIC GLOBAL TECHNOLOGIES B.V., Bergen op Zoom (NL)

(72) Inventors: Karin Irene van de Wetering, Bergen op Zoom (NL); Xiqiang Liu, Shanghai (CN)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 338 days.

(21) Appl. No.: 17/799,808

(22) PCT Filed: Feb. 2, 2021

(86) PCT No.: PCT/EP2021/052425
§ 371 (c)(1),
(2) Date: Aug. 15, 2022

(87) PCT Pub. No.: WO2021/175524
PCT Pub. Date: Sep. 10, 2021

(65) Prior Publication Data
US 2023/0080269 A1   Mar. 16, 2023

(30) Foreign Application Priority Data
Mar. 3, 2020 (EP) .................................. 20160643

(51) Int. Cl.
*B32B 27/08* (2006.01)
*B32B 3/30* (2006.01)
(Continued)

(52) U.S. Cl.
CPC ................ *B32B 27/08* (2013.01); *B32B 3/30* (2013.01); *B32B 5/147* (2013.01); *B32B 7/12* (2013.01);
(Continued)

(58) Field of Classification Search
None
See application file for complete search history.

(56) References Cited

U.S. PATENT DOCUMENTS 6,844,071 B1   1/2005  Wang et al.
2014/0251927 A1*  9/2014  Starbard ................ B01D 24/00
                                                                            210/767

(Continued)

FOREIGN PATENT DOCUMENTS

EP   1016893 A1 *  7/2000  ........... G02F 1/1333
WO   2018102340 A1   6/2018

OTHER PUBLICATIONS

English translation of Kato et al. (WO 2011/078167) (Year: 2011).*
(Continued)

*Primary Examiner* — Ronak C Patel
(74) *Attorney, Agent, or Firm* — CANTOR COLBURN LLP

(57) ABSTRACT

The present invention relates to a multi-layer polypropylene film comprising: A base layer of polypropylene (2); Optionally, a tie layer (3) comprising a blend of polypropylene and an sacrificial engineering thermoplastic; A top layer (1) comprising film having a structured surface with water contact angles (WCA) superior to 104.5°, preferentially superior to 110°, more preferentially uperior to 120°, more preferentially superior to 130°; Wherein the top layer comprises a blend 20 to 40 wt % of polypropylene and 60 to 80 wt % of said engineering thermoplastic and in which the engineering thermoplastic has been selectively etched in order to create the said structured surface.

19 Claims, 1 Drawing Sheet

(51) Int. Cl.
*B32B 5/14* (2006.01)
*B32B 7/12* (2006.01)
*B32B 27/18* (2006.01)
*B32B 27/32* (2006.01)
*B32B 27/36* (2006.01)

(52) U.S. Cl.
CPC .............. *B32B 27/18* (2013.01); *B32B 27/32* (2013.01); *B32B 27/36* (2013.01); *B32B 27/365* (2013.01); *B32B 2250/242* (2013.01); *B32B 2270/00* (2013.01); *B32B 2307/412* (2013.01); *B32B 2307/73* (2013.01); *B32B 2307/732* (2013.01); *B32B 2457/12* (2013.01); *B32B 2605/006* (2013.01)

(56) References Cited

U.S. PATENT DOCUMENTS

2019/0094693 A1*  3/2019  Aridomi .................. G06F 3/041
2019/0186035 A1*  6/2019  Haghdoost ............. C09D 5/084

OTHER PUBLICATIONS

International Search Report for International Application No. PCT/EP2021/052425, International Filing Date Feb. 2, 2021, Date of Mailing Mar. 25, 2021, 5 pages.

Written Opinion for International Application No. PCT/EP2021/052425, International Filing Date Feb. 2, 2021, Date of Mailing Mar. 25, 2021, 8 pages.

\* cited by examiner

POLYPROPYLENE FILM WITH INCREASED HYDROPHOBICITY

CROSS REFERENCE TO RELATED APPLICATIONS

This application is a National Stage application of PCT/EP2021/052425, filed Feb. 2, 2021, which claims the benefit of European Application No. 20160643.1, filed Mar. 3, 2020, both of which are incorporated by reference in their entirety herein.

TECHNICAL FIELD OF THE INVENTION

The present invention relates to polypropylene film, in particular on polypropylene film with structured surface with water contact angles superior to 104.5°. The invention also relates to a process in order to obtain the said polypropylene film.

TECHNOLOGICAL BACKGROUND OF THE INVENTION

Materials can be either hydrophilic in nature, with a water contact angle (WCA)<90°, or hydrophobic, with WCA >90°. The hydrophobic properties of the surfaces result in self-cleaning properties, where water droplets roll off the surface taking along any dirt particles. This self-cleaning properties are more efficient when the WCA is high. The self-cleaning properties achieved are very valuable for different applications, varying from windows and windshields to road surfaces and clothing.

In order to obtain such properties, various treatments, coatings, fabrics etc. have been developed. These different procedures make it possible to render a surface hydrophobic and even superhydrophobic.

However, in most cases such treatment is expensive, not durable and its not fully transparent. The latter means it cannot be used on applications, such as windows, windshields and solar cells. Especially solar cells require high transparency and need to be cleaned regularly or they will lose their efficiency over time, due to dirt accumulating on their surface.

Over the past few decades, intensive research has been done into the patterning of polymer films in order to create a rough surface to increase the WCA of the material. Techniques such as (soft) lithography are difficult to employ for large surface areas as the stamps that are required are very difficult and costly to produce and easily lose their surface structure when employed at the high speeds required for mass production. Other techniques involve the use of exotic/toxic solvent/non-solvent combinations.

It is an object of the present invention to provide an easy, fast and inexpensive way to produce polypropylene film having a structured surface with water contact angles superior to 104.5° in order to have hydrophobic properties better that a flat layer of polypropylene.

SUMMARY

This object is achieved by the present invention. In a first aspect the present invention relates to a multi-layer polypropylene film comprising:
A base layer of polypropylene (2);
Optionally, a tie layer (3) comprising a blend of polypropylene and an engineering thermoplastic;
A top layer (1) comprising film having a structured surface with water contact angles (WCA) superior to 104.5°, preferentially superior to 110°, more preferentially superior to 120°, more preferentially superior to 130°;
Wherein the top layer comprises a blend 20 to 40 wt % of polypropylene and 60 to 80 wt % of said engineering thermoplastic and in which the engineering thermoplastic has been selectively etched in order to create the said structured surface.

In some embodiment of the invention, the top layer comprise a compatibilizer constituted of PP block/graft engineering thermoplastics.

In some embodiment of the invention, the engineering thermoplastics is PBT or PC and the compatibilizer is respectively PP-b/g-PBT or PP-b/g-PCL.

In some embodiment of the invention, the amount of compatibilizer in the top layer is up to 15 wt %, preferentially between 2 and 15 wt %, more preferentially between 12 and 6 wt %.

In some embodiment of the invention, the amount of polypropylene in the tie layer is between 90 and 60 wt %, preferably 70 wt % and the amount of engineering thermoplastic is between 10 and 40 wt %, preferably 30 wt %.

In some embodiment of the invention, the thickness of the top layer is between 10 and 40 μm, preferentially 20 μm.

In some embodiment of the invention, the thickness of the tie layer is between 5 and 10 μm, preferentially 5 μm.

In some embodiment of the invention, the solvent used in order to selectively etching the engineering thermoplastics is hexaflruoro-2-propanol (HF-PIP) in case of PBT/PP top layer and dichloromethane (DCM) in case of PC/PP top layer.

In some embodiment of the invention, the viscosity ratio between the PP and the sacrificial engineering thermoplastic, in the top layer is superior to 2, preferentially superior to 5, more preferentially superior to 10.

In another aspect the present invention relates to the use of a multi-layer polypropylene film according to one of the preceding claims as a coating surface for a subtract, preferentially a panel, a transparent material, a windows, a windshields or a solar panel.

In another aspect the present invention relates to a method to produce hydrophobic polypropylene multilayer film, wherein the method comprise the following steps:
a. Immersion during 30 min of a polypropylene multilayer film with a top layer comprises a blend 20 to 40 wt % of polypropylene and 60 to 80 wt % engineering thermoplastic selected from the group comprising PBT and PC, in an etching solvent selected from hexaflruoro-2-propanol (HF-PIP) in case of PBT/PP top layer and dichloromethane (DCM) in case of PC/PP top layer; and optionally shaken, preferentially at a frequency of 100 Hz.
b. Dry the polypropylene multilayer film in a fume hood for a minimum of 24 hours.

It is noted that the invention relates to all possible combinations of features described herein, preferred in particular, are those combinations of features that are present in the claims. It will therefore be appreciated that all combinations of embodiments; features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous as it offers a simpler, more economical process for the preparation of the product/composition. Similarly, it is also to be understood that a description on a process comprising certain steps also discloses a process consisting of these steps. The process consisting of these steps may be advantageous as it offers a simpler, more economical process.

When values are mentioned for a lower limit and an upper limit for a parameter, ranges made by the combinations of the values of the lower limit and the values of the upper limit are also understood to be disclosed.

BRIEF DESCRIPTION OF THE DRAWINGS

FIG. 1b illustrates an embodiment in which no tie layer is present;
and
    FIG. 1c illustrates an embodiment in which a tie layer is present.

DETAILED DESCRIPTION

The present invention preferably relates to a multi-layer films are prepared with a polypropylene (PP) base (2) and a top layer (1) comprising a blend of PP and a sacrificial engineering thermoplastic.

This top layer is etched using a selective solvent to remove the sacrificial engineering thermoplastic. This leaves a structured surface with water contact angles of >104.5°, preferentially superior to 110°, more preferentially superior to 120°, more preferentially superior to 130°.

Preferentially, the sacrificial engineering thermoplastic is polybutylene terephthalate (PBT) or polycarbonate (PC).

In order to selectively etch only one component, the sacrificial engineering plastic, the used solvent should dissolve the sacrificial engineering thermoplastic, while keeping the PP phase intact. For this purpose, the following sacrificial engineering thermoplastic/solvent combinations were selected:
    PBT/hexafluoro-2-propanol (HF-PIP)
    PC/dichloromethane (DCM)
In addition, in order to obtain a higher WCA the blend of top layer must have a majority of sacrificial engineering thermoplastic in its composition.

Indeed, a try has been run in which the top layer was a PP rich blend film containing 70 wt % of PP and 30 wt % of sacrificial engineering thermoplastic.

Before etching, the WCA of the blend is only slightly lower than that of PP alone, indicating there is only a small increase in polarity upon sacrificial engineering thermoplastic addition to the PP.

Figure 1:
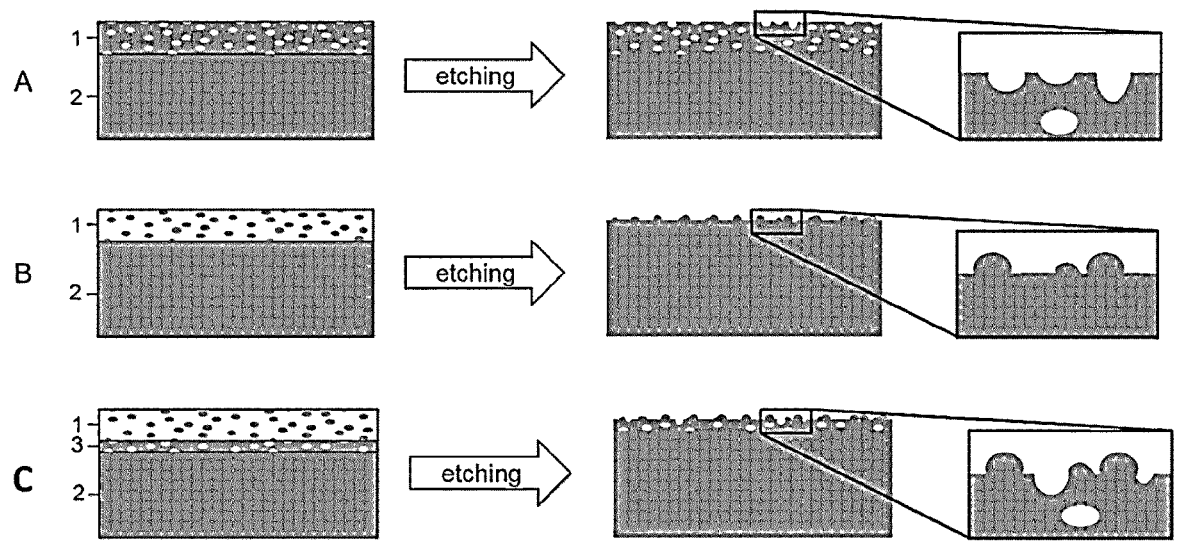
FIG. 1a illustrates a comparative embodiment which is not part of the invention. In this embodiment the top layer is composed by a majority of PP.
FIG. 1b and FIG. 1c illustrates embodiments of the invention in which the top layer is composed by a majority of sacrificial engineering thermoplastic.

After etching, there is only a small increase in WCA as the polar sacrificial engineering thermoplastic is removed as shown in FIG. 1A. However, there does not seem to be any increase in WCA as a result of surface roughening upon etching.

This effect can be explain due to the amount of PP in the blend. The surface of the top film is mostly covered by PP, which protects/shield the dispersed sacrificial engineering thermoplastic underneath, letting only a few small pockets of sacrificial engineering thermoplastic being removed, leaving a nearly flat surface.

It is clear from these results that a PP rich top layer does not give the desired effect.

The presence of only "negative" structures at the surface seems to be less effective than a "positive" structures at the surface shown in FIG. 1B.

After various tests, it has been shown that a maximum quantity of 40-45 wt % is required in order to avoid the shielding effect of the PP.

Furthermore, it has been shown that a minimum of 20 wt % of PP is required in order to have a structured pattern at the surface of the film. With a lower concentration, there is not enough PP and it is the entire top layer which is etched by the solvent.

Therefore, the highest contact angles are achieved for PP concentrations of 20-40 wt-% within the top layer.

At lower PP levels (<20 wt %), the PP fibrils probably do not form a network and may be completely removed from the surface upon etching. At higher PP levels (>45 wt %), the PP will either become the major phase or form a very thick impenetrable layer at the top surface, preventing proper etching, as is the case for a PP rich top layer.

In some embodiment, a tie layer (2) comprising a blend of polypropylene and the engineering thermoplastic may be present between the top layer and the PP base layer.

At the contrary of the top layer, this tie layer is in majority (>50 wt %) made of PP, preferentially between 60 to 90 wt % of PP, more preferentially, between 70-80 wt % of PP, more preferentially 70 wt % of PP.

This tie layer is used in order to promote the adhesion of the top layer as it contain a small amount of sacrificial engineering thermoplastic.

In addition, the presence of this tie layer allow to have "negative" and "positive" structures at the surface of the film allowing an higher WCA as shown in FIG. 10.

In some embodiment, the thickness of the tie layer may be between 5 and 10 µm, preferentially 5 µm.

In some embodiment, a compatibilizer may be used in a concentration up to 15 wt % in the top layer in order to promote the adhesion of the top layer and increasing the WCA.

Indeed, as the etched top layer may lack mechanical integrity, especially as the sacrificial engineering thermoplastic is used as a major phase of the top layer, the top layer would need proper support.

One difficulty by using PP film is the fact that PP is immiscible and even incompatible with most other polymers. Likely, any blend would therefor require a compatibilizer in order to tune the morphology and thereby control the topography of the surface after etching.

The compatibilizer is specific to the sacrificial engineering thermoplastic used. It may consist of a block/graft copolymer of PP with PBT, in case of PP/PBT; or polycaprolactone (PCL), in case of PP/PC.

Those compatibilizer were produced starting from maleic anhydride grafted PP (PP-MAH (0.8 wt-% MAH)) converted into PP-OH, using ethanolamine.

For the compatibilizer of PP/PBT blends, PP-b/g-PBT was prepared from PP-OH and PBT. The grafting of PBT has been done in the presence of Aluminum diethyl Phosphinic acid, in a ratio of 67:33.

For the compatibilizer of PP/PC blends, PP-b/g-PCL was prepared from PP-OH and PCL. The grafting of PCL has been done in presence of Tin(II) 2-ethylhexanoate, in a ratio of 33:67.

The optimal compatibilizer level in the top layer is between 2 and 15 wt %, more preferentially 6 to 12 wt %, more preferentially 6 to 10 wt %, more preferentially 6 wt %.

Figure 2:
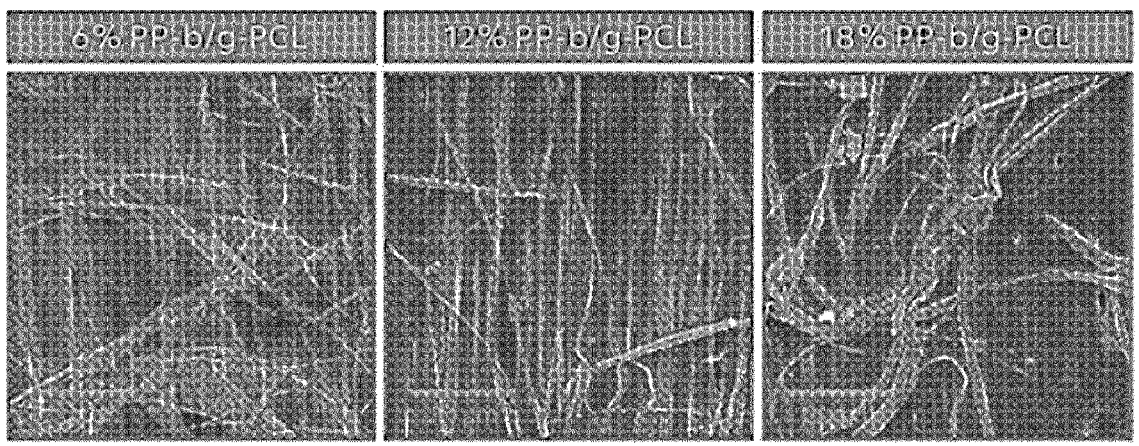
FIG. 2 illustrates microanalysis of the samples showing the PP fibrils in function of different amount of compatibilizer.

Microanalysis of the samples show that the PP fibrils increase in thickness upon increasing the compatibilizer level and therefor the surface get "flatter" than a surface with thin PP fibrils, FIG. 2.

In some embodiment, the thickness of the top layer is between 10 and 40 μm, preferentially 20 μm.

In some embodiment, the presence of a tie layer may avoid the top layer to be pealed of by the solvent when the concentration of PP is low; or, when the thickness of the top layer is higher than 30 μm; or in the absence of compatibilizer. However the presence of this tie layer is not essential to the invention.

In some embodiment, the viscosity ratio between the PP and the sacrificial engineering thermoplastic is superior to 2, preferentially superior to 5, more preferentially superior to 10. Indeed, it has been surprisingly shown that a higher viscosity ratio increases drastically the WCA of the film (see EX7 and EX11) allowing to be superhydrophobic with a WCA >~130°.

It is noted that the invention relates to all possible combinations of embodiment described herein, preferred in particular are those combinations of features that are present in the claims. It will therefore be appreciated that all combinations of embodiments; features relating to the composition according to the invention; all combinations of features relating to the process according to the invention and all combinations of features relating to the composition according to the invention and features relating to the process according to the invention are described herein.

Another aspect of the invention is a process to produce hydrophobic polypropylene multilayer film, wherein the process comprise the following steps:

a) Immersion during 30 min of a polypropylene multi-layer film with a top layer comprises a blend 20 to 40 wt % of polypropylene and 60 to 80 wt % engineering thermoplastic selected from the group comprising PBT and PC, in an etching solvent selected from hexaflruoro-2-propanol (HF-PIP) in case of PBT/PP top layer and dichloromethane (DCM) in case of PC/PP top layer; and optionally shaken, preferentially at a frequency of 100 Hz;

b) Dry the polypropylene multilayer film in a fume hood for a minimum of 24 hours.

Another aspect of the invention is the use of a multi-layer polypropylene film according the invention as a subtract coating surface, preferentially a panel, a transparent material, a windows, a windshields or a solar panel.

EXAMPLES

Raw Materials

The raw materials used in this report are listed in the following table:

| Raw | Description | Grade | Supplier |
|---|---|---|---|
| PP-MAH | Maleated polypropylene (0.8 wt-% MAH) | Exxelor PO1020 | ExxonMobil |
| EA | Ethanolamine | N/A | Sigma-Aldrich |
| catalyst 1 | Tin(II) 2-ethylhexanoate | N/A | Sigma-Aldrich |
| catalyst 2 | Aluminum diethyl Phosphinic acid | Exolit OP1240 | Clariant |
| PCL | Polycaprolactone | Capa 6800 | Perstorp |
| PP-1 | Polypropylene (MFI 3) | PP 500P | SABIC |
| PP-2 | Polypropylene (MFI 0.2) | PP 531Ph | SABIC |
| PC-1 | Polycarbonate (~30.5 kDa) | PC105 | SABIC |
| PC-2 | Polycarbonate (~21.8 kDa) | PC175 | SABIC |
| PBT | Polybutylenetherephthalate (~120 kDa) | PBT 315 | Smile Plastics |

Film Extrusion

All multi-layer films were extruded on a Labtech™ LCR300 25 mm blown film coextruder with an L/D ratio of 30, equipped with a winding system. The extruder was equipped with a 300 mm wide multilayer die with a A/B/C/B/A design and an adjustable die gap. The extrusion profiles used were adjusted for each composition and are indicated in section 4. PP and PBT reference films were extruded at 240° C. and ~100 rpm.

Film Etching

Films were cut into pieces of ~1×6 cm, immersed in solvent and shaken for 30 min. at a frequency of 100 Hz. This process was repeated twice before the films were removed and dried in a fume hood for a minimum of 24 hrs. The solvent used was hexaflruoro-2-propanol (HF-PIP) in case of PBT/PP and dichloromethane (DCM) in case of PC/PP samples.

Film Evaluation

WCA measurements Water contact angle measurements were carried out on an Attension™ THETA optical tensiometer, using a droplet of 2 μL of demineralized water deposited with a special hydrophobic nozzle. The temperature and relative humidity were recorded and were in the range of 22-23° C. and 50-70% R.H.

TABLE 1

The formulations used in a multi-layer polypropylene film comprising a top layers of PC/PP, including WCA data before and after etching.

|  |  | C-EX1 | C-EX2 | C-EX3 | EX4 | EX5 | EX6 | EX7 |
|---|---|---|---|---|---|---|---|---|
| Base layer |  |  |  |  |  |  |  |  |
| PP-1 | [wt %] | 100 |  | 100 | 100 | 100 | 100 | 100 |
| PC-1 | [wt %] |  | 100 |  |  |  |  |  |
| Thickness | [μm] | 100 | 100 | 80 | 80 | 80 | 80 | 80 |
| Tie layer |  |  |  |  |  |  |  |  |
| PP-1 | [wt %] |  |  |  |  |  | 70 | 70 |
| PC-1 | [wt %] |  |  |  |  |  | 30 | 30 |
| Thickness | [μm] |  |  |  |  |  | 5 | 5 |

TABLE 1-continued

The formulations used in a multi-layer polypropylene film comprising a top layers of PC/PP, including WCA data before and after etching.

|  |  | C-EX1 | C-EX2 | C-EX3 | EX4 | EX5 | EX6 | EX7 |
|---|---|---|---|---|---|---|---|---|
| Top layer |  |  |  |  |  |  |  |  |
| PP-1 | [wt %] |  |  | 70 | 30 | 30 | 26 | 22 |
| PP-2 | [wt %] |  |  |  |  |  |  |  |
| PC-1 | [wt %] |  |  | 30 | 70 | 70 | 68 | 66 |
| PC-2 | [wt %] |  |  |  |  |  |  |  |
| PP-b/g-PCL | [wt %] |  |  |  |  |  | 6 | 12 |
| Thickness | [µm] |  |  | 40 | 20 | 40 | 20 | 20 |
| Total wt % PP | [wt %] |  |  | 70 | 30 | 30 | 30 | 30 |
| WCA before etching | [°] | 104.5 | 94.7 | 101.1 | 102 | 101.2 | 92 | 99 |
| WCA after etching | [°] |  |  | 104.6 | 108.3 | 125.9 | 132.1 | 128.8 |

TABLE 1

The formulations used in a multi-layer polypropylene film comprising a top layers of PC/PP, including WCA data before and after etching (Suite)

|  |  | C-EX1 | C-EX2 | C-EX3 | EX8 | EX9 | EX10 | EX11 |
|---|---|---|---|---|---|---|---|---|
| Base layer |  |  |  |  |  |  |  |  |
| PP-1 | [wt %] | 100 |  | 100 | 100 | 100 | 100 | 100 |
| PC-1 | [wt %] |  | 100 |  |  |  |  |  |
| Thickness | [µm] | 100 | 100 | 80 | 80 | 80 | 80 | 80 |
| Tie layer |  |  |  |  |  |  |  |  |
| PP-1 | [wt %] |  |  |  | 70 | 70 | 70 | 70 |
| PC-1 | [wt %] |  |  |  | 30 | 30 | 30 | 30 |
| Thickness | [µm] |  |  |  | 5 | 5 | 5 | 5 |
| Top layer |  |  |  |  |  |  |  |  |
| PP-1 | [wt %] |  |  | 70 | 18 | 12 | 42 |  |
| PP-2 | [wt %] |  |  |  |  |  |  | 22 |
| PC-1 | [wt %] |  |  | 30 | 64 | 76 | 45 |  |
| PC-2 | [wt %] |  |  |  |  |  |  | 66 |
| PP-b/g-PCL | [wt %] |  |  |  | 18 | 12 | 12 | 12 |
| Thickness | [µm] |  |  | 40 | 20 | 20 | 20 | 20 |
| Total wt % PP | [wt %] |  |  | 70 | 30 | 20 | 50 | 30 |
| WCA before etching | [°] | 104.5 | 94.7 | 101.1 | 99.4 | 103.7 | 107 | 98.5 |
| WCA after etching | [°] |  |  | 104.6 | 108.7 | 110.7 | 110.9 | 107.9 |

EX11 blends were made based on high viscosity PP (PP-2) and low viscosity PC (PC-2). This blend is estimated to have a viscosity ratio of 1-2 under compounding conditions used. EX7 blends were made based medium viscosity PP (PP-1) and high viscosity PC (PC-1), which should have a viscosity ratio of 11-12 under compounding conditions used.

Both blends were used as top layer on a PP multilayer film with a tie layer and etched in the same conditions.

Before etching, there is no effect of the viscosity ratio, which is to be expected, as the polarity of the surface is not changed.

However, after etching, the WCA for a high viscosity ratio is much higher than when a low viscosity ratio is used.

Therefore the best result are achieved when the viscosity ration between the PP and the sacrificial engineering thermoplastic is high.

TABLE 2

The formulations used in a multi-layer polypropylene film comprising a top layers of PBT/PP, including WCA data before and after etching

|  |  | C-EX1 | C-EX12 | C-EX13 | EX14 | EX15 | EX16 | EX17 |
|---|---|---|---|---|---|---|---|---|
| Base layer |  |  |  |  |  |  |  |  |
| PP-1 | [wt %] | 100 |  |  | 100 | 100 | 100 | 100 |
| PBT | [wt %] |  | 100 |  |  |  |  |  |
| Thickness | [µm] | 100 | 100 | 80 | 80 | 80 | 80 | 80 |

TABLE 2-continued

The formulations used in a multi-layer polypropylene film comprising
a top layers of PBT/PP, including WCA data before and after etching

|  |  | C-EX1 | C-EX12 | C-EX13 | EX14 | EX15 | EX16 | EX17 |
|---|---|---|---|---|---|---|---|---|
| Tie layer |  |  |  |  |  |  |  |  |
| PP-1 | [wt %] |  |  |  | 70 | 70 | 70 | 70 |
| PBT | [wt %] |  |  |  | 30 | 30 | 30 | 30 |
| Thickness | [µm] |  |  |  | 5 | 5 | 5 | 5 |
| Top layer |  |  |  |  |  |  |  |  |
| PP-1 | [wt %] |  |  | 70 | 31 | 27 | 17 | 37 |
| PBT | [wt %] |  |  | 30 | 63 | 61 | 71 | 51 |
| PP-b/g-PBT | [wt %] |  |  |  | 6 | 12 | 12 | 12 |
| Thickness | [µm] |  |  | 40 | 20 | 20 | 20 | 20 |
| Total wt % PP | [wt %] |  |  | 70 | 35 | 35 | 25 | 45 |
| WCA before etching | [°] | 104.5 | 84 | 102.6 | 91.8 | 94.8 | 96.9 | 102.3 |
| WCA after etching | [°] |  |  | 105.2 | 124.3 | 129 | 129.8 | 102.8 |

EX11 blends were made based on high viscosity PP (PP-2) and low viscosity PC (PC-2). This blend is estimated to have a viscosity ratio of 1-2 under compounding conditions used. EX7 blends were made based medium viscosity PP (PP-1) and high viscosity PC (PC-1), which should have a viscosity ratio of 11-12 under compounding conditions used.

Both blends were used as top layer on a PP multilayer film with a tie layer and etched in the same conditions.

Before etching, there is no effect of the viscosity ratio, which is to be expected, as the polarity of the surface is not changed.

However, after etching, the WCA for a high viscosity ratio is much higher than when a low viscosity ratio is used.

Therefore the best result are achieved when the viscosity ration between the PP and the sacrificial engineering thermoplastic is high.

The invention claimed is:

1. A multi-layer polypropylene film comprising:
   a base layer of a polypropylene (PP);
   optionally, a tie layer comprising a blend of polypropylene and a sacrificial engineering thermoplastic selected from polybutylene terephthalate (PBT) or polycarbonate (PC); and
   a top layer comprising a film having a structured surface with a water contact angle of greater than 104.5°;
   wherein the top layer comprises a blend 20 to 40 wt % of the polypropylene and 60 to 80 wt % of said sacrificial engineering thermoplastic and in which the sacrificial engineering thermoplastic has been selectively etched in order to create the said structured surface.

2. The multi-layer polypropylene film according to claim 1, wherein the top layer comprises a compatibilizer constituted of polypropylene block/graft engineering thermoplastics.

3. The multi-layer polypropylene film according to claim 2, wherein the compatibilizer is respectively a block/graft copolymer of polypropylene with polybutylene terephthalate (PBT) (PP-b/g-PBT) or a block/graft copolymer of polypropylene with polycaprolactone (PP-b/g-PCL).

4. The multi-layer polypropylene film according to claim 2, wherein an amount of the compatibilizer in the top layer is up to 15 wt %.

5. The multilayer polypropylene film according to claim 2, wherein an amount of the compatibilizer in the top layer is between 6 and 15 wt %.

6. The multi-layer polypropylene film according to claim 1, comprising the tie layer, wherein an amount of the polypropylene in the tie layer is between 90 and 60 wt %, and an amount of the sacrificial engineering thermoplastic is between 10 and 40 wt %.

7. The multi-layer polypropylene film according to claim 1, wherein a thickness of the top layer is between 10 and 40 µm.

8. The multi-layer polypropylene film according to claim 1, comprising the tie layer, wherein a thickness of the tie layer is between 5 and 10 µm.

9. The multi-layer polypropylene film according to claim 1, wherein a solvent used in order to selectively etch the sacrificial engineering thermoplastics is hexaflruoro-2-propanol (HF-PIP) when the top layer comprises a blend of polypropylene (PP) and polybutylene terephthalate (PBT), and dichloromethane (DCM) when the top layer comprises a blend of polypropylene (PP) and polycarbonate (PC).

10. The multi-layer polypropylene film according to claim 1, wherein a viscosity ratio between the polypropylene (PP) and the sacrificial engineering thermoplastic, in the top layer is greater than 2.

11. The multilayer polypropylene film according to claim 1, wherein a viscosity ratio between the polypropylene and the sacrificial engineering thermoplastic, in the top layer is greater than 5.

12. The multilayer polypropylene film according to claim 1, wherein a viscosity ratio between the polypropylene and the sacrificial engineering thermoplastic, in the top layer, is greater than 10.

13. The multi-layer polypropylene film according to claim 1, wherein the structured surface comprises positive structures.

14. The multi-layer polypropylene film according to claim 1, wherein the structured surface comprises negative structures and positive structures.

15. The multi-layer polypropylene film according to claim 1, comprising the tie layer, wherein the tie layer comprises polypropylene and polybutylene terephthalate (PBT).

16. The multi-layer polypropylene film according to claim 1, comprising the tie layer, wherein the tie layer comprises polypropylene and polycarbonate (PC).

17. An article comprising the multi-layer polypropylene film according to claim 1 disposed on a substrate.

18. The article of claim 17, wherein the article is a panel, a transparent material, a winder, a windshield, or a solar panel.

19. A method to produce the multi-layer polypropylene film according to claim 1, the method comprising the following steps:
   a. immersing a polypropylene multilayer film with a top layer comprising a blend 20 to 40 wt % of a polypropylene and 60 to 80 wt % of a sacrificial engineering thermoplastic selected from a polybutylene terephthalate (PBT) or a polycarbonate (PC), in an etching solvent selected from hexaflruoro-2-propanol (HF-PIP) when the top layer comprises a blend of polypropylene (PP) and polybutylene terephthalate (PBT), and dichloromethane (DCM) when the top layer comprises a blend of polypropylene (PP) and polycarbonate (PC); and
   b. drying the polypropylene multilayer film in a fume hood for a minimum of 24 hours.

* * * * *